(12) United States Patent
Hagen

(10) Patent No.: US 7,125,195 B2
(45) Date of Patent: Oct. 24, 2006

(54) LOCKING MEANS FOR AN INSERT

(75) Inventor: Øystein Hagen, Hagen, Lyngdal (NO) 4580

(73) Assignee: Oystein Hagen, Lyngdal (NO)

( * ) Notice: Subject to any disclaimer, the term of this patent is extended or adjusted under 35 U.S.C. 154(b) by 0 days.

(21) Appl. No.: 10/292,905

(22) Filed: Nov. 13, 2002

(65) Prior Publication Data

US 2003/0118400 A1 Jun. 26, 2003

(51) Int. Cl.
*B25B 1/24* (2006.01)

(52) U.S. Cl. .................. 403/381; 403/315; 403/317; 294/102.1; 81/185.1; 175/423

(58) Field of Classification Search ............... 403/381, 403/315, 316, 317, 318, 319, 320; 294/102.1, 294/102.2, 86.12, 86.22, 86.25, 86.27; 188/67; 411/410, 919; 175/423; 81/185.1
See application file for complete search history.

(56) References Cited

U.S. PATENT DOCUMENTS

| 733,500 | A | * | 7/1903 | Moore ......................... 403/381 |
| 959,854 | A | * | 5/1910 | Grierson ...................... 403/381 |
| 1,758,108 | A | * | 5/1930 | Goeser ........................ 175/423 |
| 2,245,979 | A | * | 6/1941 | Johnson ....................... 175/423 |
| 2,353,531 | A | * | 7/1944 | Whitney ....................... 411/410 |
| 3,308,697 | A | * | 3/1967 | Cocco ........................... 82/158 |
| 3,433,104 | A | * | 3/1969 | Milewski et al. ............ 408/156 |
| 3,835,354 | A | * | 9/1974 | Torres-Pena ............... 312/265.4 |
| 4,275,929 | A | * | 6/1981 | Krekeler ...................... 299/102 |
| 4,405,285 | A | * | 9/1983 | Surdi .......................... 411/119 |
| 4,415,193 | A | * | 11/1983 | Carlberg .................. 294/102.2 |
| 4,576,067 | A | * | 3/1986 | Buck .......................... 81/185.1 |
| 5,060,542 | A | * | 10/1991 | Hauk .......................... 81/57.34 |
| 5,221,099 | A | * | 6/1993 | Jansch ...................... 294/102.2 |
| 5,451,084 | A | * | 9/1995 | Jansch ...................... 294/102.2 |
| 6,079,509 | A | * | 6/2000 | Bee et al. .................... 294/902 |
| 6,378,399 | B1 | * | 4/2002 | Bangert .................... 294/102.2 |
| 6,579,033 | B1 | * | 6/2003 | Ajiki ........................... 403/381 |
| 6,595,734 | B1 | * | 7/2003 | Duran et al. ................ 411/427 |

* cited by examiner

*Primary Examiner*—Daniel P. Stodola
*Assistant Examiner*—Ernesto Garcia
(74) *Attorney, Agent, or Firm*—Miller, White, Zelano, Branigan, P.C.

(57) ABSTRACT

Locking bracket for a slider in a dovetail slot (3), where a further dovetail slot (4) is arranged perpendicularly to the first dovetail slot (3), in which a locking bracket (5) can be displaced from a position whereby the glider is locked by the locking bracket (5) to a position where the glider is free to be moved passed the locking bracket (5) and that a screw (6) captures the locking bracket (5) through a countersunk hole in the locking bracket (5), whereby the locking bracket is maintained or released by loosening the screw (6).

4 Claims, 1 Drawing Sheet

LOCKING MEANS FOR AN INSERT

BACKGROUND OF THE INVENTION

Figure 1:
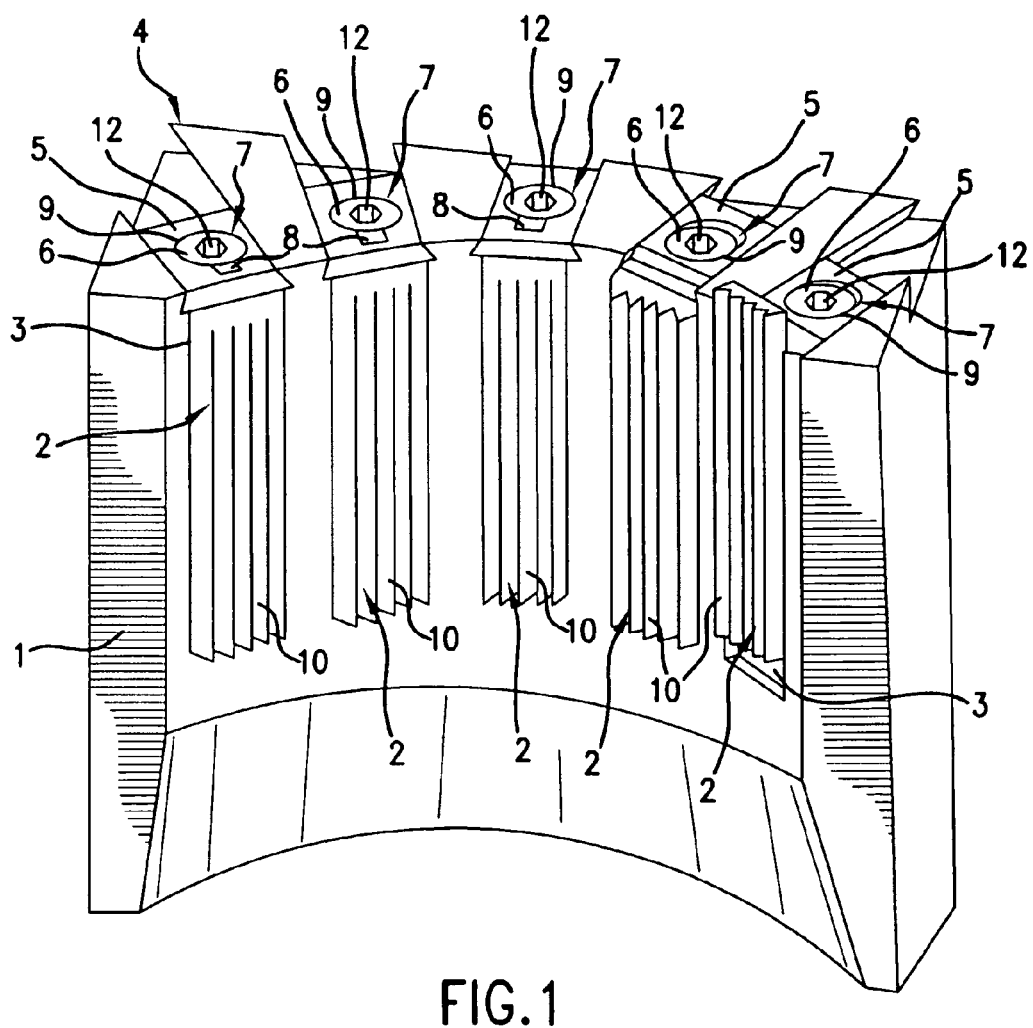

The present invention is related to a locking means for an insert, especially for clamping jaws for clamping drill pipes and casings during drilling operations.

Inserts which are guided into a tool dovetail slot, as inserts are used in clamping jaws in the petroleum industry, traditionally are locked with loose screws at both ends. The dovetail slots extend axially in the clamping jaws. To replace such inserts the screws have to be removed, which is connected with the risk of loosing screws down into the drilling hole. Furthermore the operation is time consuming.

SUMMARY OF THE INVENTION

With the locking means according to the present invention the above mentioned disadvantages with known solutions, are avoided. This is achieved with the locking means according to the present invention as defined with the features stated in the claims.

BRIEF DESCRIPTION OF THE SEVERAL VIEWS OF DRAWINGS

FIG. 1 is a perspective view of a section of a locking jaw.

DETAILED DESCRIPTION

The drawing discloses a section of a locking or clamping jaw 1 in a perspective view where some of the inserts 2 are locked.

The FIGURE discloses a section of a clamping jaw 1, the internal lower portion of which is cut conically downwardly and outwardly to avoid damage on the section during operations.

The FIGURE discloses a section of a clamping jaw 1, the internal lower portion of which is cut conically downwardly and outwardly to avoid damage on the section during operations.

The inserts 2 may be guided into dovetail slots 3 which extend axially with respect to the jaws. The slots have the same length as the inserts 2 such that the inserts may be guided to abutment and the end of the slot. The inserts have teeth in the form of axially extending ribs 10 for engaging drill pipes and casings (not shown).

Perpendicularly to the slots 3 a second dovetail slot 4 is arranged, in which a locking bracket 5 can be displaced to overlap the end of the insert 2 or in the opposite direction to release the insert 2 so this can be pulled out.

The locking bracket 5 comprises a keyhole shaped hole 7 through which a screw 6 is secured to the section 1 of the clamping jaw. The keyhole shaped hole 7 has a small opening 8 and a larger opening 9. The larger opening 9 of the keyhole shaped hole 7 is countersunk in such a way that the screw 6 may be screwed completely down into the locking bracket 5.

For replacement of the insert 2 the screw 6 is released so much that the locking bracket 5 can be displaced away from the end of the insert 2, where after the insert 2 easily can be axially displaced out of the dovetail slot 3 and a new insert may be inserted. The locking bracket 5 suitably can be provided with a spring ensuring that the locking bracket 5 is displaced away from the insert 2 when the screw is released. The screw 6 slides in the keyhole slot and thereby is captured in the dovetail slot 4.

Thereafter the insert 2 is locked by displacing the end of the locking bracket 5 above the end of the insert 2 where after the bracket 2 is fixed by the screw 6. This movement may be achieved by tightening the screw 6 into the countersink whereby the locking bracket 5 is displaced in correct position to lock the insert against movement.

The clamping jaws preferably are made of special steel with good abrasion resistant properties, giving the dovetail slots 3 and 4 a long lifetime.

Preferably each screw 6 includes an internal hexagon 12 and is a socket set screw.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A locking arrangement in combination with a clamping jaw used to clamp drill pipes and casings, comprising: a slider (2) that extends axially in the clamping jaw in a first dovetail slot (3), the slider (2) having teeth (10) thereon for gripping drill pipes or casings, a second dovetail slot (4) oriented perpendicularly to the first dovetail slot (3); a locking bracket (5) in the second dovetail slot (4) and being movable from a position in which the slider is locked by the locking bracket (5) to a position wherein the slider is unlocked, and a screw (6) disposed through a countersunk hole (9) in the locking bracket (5), whereby the locking bracket (5) is maintained to lock the slider (2) by the screw (6) or released from locking the slider (2) by axially sliding in the second dovetail slot (4) upon loosening the screw (6).

2. The locking arrangement according to claim 1 wherein the screw (6) has an internal hexagon (12) for receiving a hexagonal wrench head.

3. The locking arrangement according to claim 1, wherein the countersink hole (9) in the locking bracket (5) is conical and is usable to displace the locking bracket (5) from a free position to a locked position by tightening the screw (6).

4. The locking arrangement of claim 1 wherein a keyhole shaped hole (8,9) defined by a small opening portion (8) and the countersink hole (9) extends through the locking bracket (5) for receiving the screw(6).

* * * * *

UNITED STATES PATENT AND TRADEMARK OFFICE
CERTIFICATE OF CORRECTION

| | | |
|---|---|---|
| PATENT NO. | : 7,125,195 B2 | Page 1 of 1 |
| APPLICATION NO. | : 10/292905 | |
| DATED | : October 24, 2006 | |
| INVENTOR(S) | : Oystein Hagen | |

It is certified that error appears in the above-identified patent and that said Letters Patent is hereby corrected as shown below:

On the front page, Item (75) Inventor: reads "Hagen, Hagen, Lyngdal" should read -- Hagen, Lyngdal --
On the front page, Foreign Application Priority Data: should read -- Nov. 13, 2001 . . . (NO) . . . 2001 5551 --

Signed and Sealed this

Twenty-seventh Day of March, 2007

JON W. DUDAS
*Director of the United States Patent and Trademark Office*